United States Patent
Pasch et al.

[11] 3,836,306
[45] Sept. 17, 1974

[54] TRANSFER MOLDING APPARATUS
[75] Inventors: Lambert Pasch, Nutheim; Heinz Wagemann, Aachen, both of Germany
[73] Assignee: Uniroyal A.G., Aachen, Germany
[22] Filed: July 16, 1973
[21] Appl. No.: 379,284

[30] Foreign Application Priority Data
Aug. 29, 1972 Germany............................ 2242447

[52] U.S. Cl... 425/322, 425/DIG. 51, 425/DIG. 228
[51] Int. Cl............................................. B29h 3/12
[58] Field of Search............ 425/250, 251, DIG. 51, 425/DIG. 228

[56] References Cited
UNITED STATES PATENTS

| | | | |
|---|---|---|---|
| 2,186,160 | 1/1940 | Anderson..................... | 425/DIG. 51 |
| 2,351,582 | 6/1944 | Bohrer......................... | 425/DIG. 51 |
| 2,865,050 | 12/1958 | Strauss....................... | 425/DIG. 229 |
| 3,070,843 | 1/1963 | Jurgeleit............................. | 425/145 |
| 3,360,829 | 1/1968 | Germ................................ | 125/251 |
| 3,392,217 | 7/1968 | Zitzloff........................ | 5/DIG. 228 |

*Primary Examiner*—Robert D. Baldwin
*Assistant Examiner*—David S. Safran
*Attorney, Agent, or Firm*—Philip Sands

[57] ABSTRACT

Apparatus for molding elastomeric stock, comprising an apertured, heat-resistant, flexible, insulation plate arranged between a heated mold and the discharge portion of an elastomeric stock injection unit such that a mold cavity is aligned with an array of apertures in the insulation plate which intercommunicate the mold cavity with an internal discharge chamber in the injection unit. A mold cavity cover is carried by the insulation plate and confronts the mold cavity, the cover and upper portion of the cavity when juxtaposed defining a constriction therebetween. When the mold and injection unit are moved relative to one another such that each presses against the other through the intermediary of the insulation plate, there is effected expulsion and transferring of a portion of elastomeric stock from the injection unit into the mold cavity to be cured, an excess portion of elastomeric stock remaining in the injection unit being prevented from undergoing curing by means of the presence of the insulation plate. The constriction between the cover and the upper portion of the cavity generates a score line in the cured transferred portion of stock along which scrap cured in the cavity may be separated from the cured product.

23 Claims, 7 Drawing Figures

TRANSFER MOLDING APPARATUS

BACKGROUND OF THE INVENTION

This invention relates to apparatus for molding parts from viscous materials and, more particularly, to molding apparatus in which molding compound, or elastomeric stock, is transferred from an injection cylinder to a plurality of closed mold cavities through the intermediary of a plurality of passageways which intercommunicate the cylinder with the cavities.

One example of such a molding apparatus is the invention of Herbert F. Jurgeleit disclosed in U.S. Pat. No. 2,883,704, dated Apr. 28, 1959. In this patent a multi-plate, "flashless" mold is provided having a plurality of cavities therein. The term "flashless mold" as used herein has reference to a multi-cavity, multi-part mold in which the cavity forming portions of the mold are independently movable sufficiently to permit independent stacking or closing of such portions either by reason of an actual flexure of the flexible plate member which either forms or directly supports such portions of the mold, or by reason of a movement of such portions relative to a retainer plate, and in which the force for independently closing or holding such cavity forming portions closed is transmitted to each group of cavity forming portions by a common conformable medium such as the molding compound or other conformable medium. Each cavity of the flashless mold is closed except for the presence of a plurality of passageways or sprues provided in the top plate of the mold which intercommunicate each cavity with the space above the top mold plate. In addition, an injection unit is provided which comprises an injection piston movable in an open-ended cylinder commonly referred to as a "bottomless cylinder." The injection unit is usually affixed to the lower surface of the heated, upper platen of a press and the mold is usually removably placed atop the upper surface of the heated, lower platen or ram cap of the press, directly in line with the injection unit.

In the operation of this apparatus, a quantity of molding compound in excess of that which would be sufficient to fill all the cavities is placed on the top plate of the mold, and the press is closed. During closure, the top plate of the mold contacts the lower end of the bottomless cylinder, closing the lower end thereof. As closure of the press continues, the mold and cylinder move upward relative to the injection piston, causing the molding compound atop the mold to become compressed between the injection piston and the top mold plate and to flow through the various sprues into the respective mold cavities. The excess compound in the injection cylinder is maintained under compression both during filling of the cavities and during the time that it takes for the heated upper and lower platens to cure the compound in the filled cavities. This maintains hydraulic pressure on the top plate of the flashless mold in order to keep the cavities closed during the filling and curing period (limiting flash formation at the mold parting lines) and in order to prevent backrinding or backflow of the compound from the cavities through the sprues (with the creation of attendant, undesirable blemishes on, and/or changes in, the dimensions of the parts being molded in the cavities). In this process, however, the excess compound in the injection cylinder is cured along with the compound in the mold cavities and represents waste which is generally scrapped.

Various attempts have been made to improve on the above prior art procedure in order to overcome the losses inherent in the scrapping of the molding compound which is cured in the injection cylinder. One such attempt culminated in the invention of Herbert F. Jurgeleit disclosed in U.S. Pat. No. 3,070,843, dated Jan. 1, 1963. In that process, a piston-cylinder injection unit is closed by a flexible, metallic plate, which plate not only allows the hydraulic pressure of the molding compound to be transmitted to the top mold plate of a mold (single or multiple cavity, flashless or non-flashless) during the injection cycle (to thereby assist in keeping the mold cavities closed during such injection), but retains the molding compound in the injection unit when the molds are thereafter moved away from the injection unit into a separate heated, curing area. With this arrangement, curing of the excess compound in the injection unit may be avoided. However, this is at the expense of providing a plurality of molds and a separate curing area. Moreover, when the injection cylinder and mold are separated to facilitate movement of the mold to the separate curing area, the pressure in the cavities and on the top mold plate is released, allowing, to some degree, backrinding of compound through the sprues and possible flash formation at the parting lines of the mold.

Another attempt to overcome the losses inherent in the scrapping of molding compound which is cured in the injection cylinder is exemplified by the invention of Herbert F. Jurgeleit disclosed in U.S. Pat. No. 3,121,918, dated Feb. 25, 1964. In this process, a piston-cylinder injection unit, which cooperates with a multi-cavity, flashless mold, is also closed by a flexible, metallic plate but, instead of moving the mold to a separate, heated, curing area to prevent curing of the excess compound in the injection cylinder, the injection cylinder itself is moved to a cool area while the mold remains in the heated area and the compound in the cavities is cured. In this instance, again, the injection pressure is relieved after the cavities have been filled in order to allow removal of the injection cylinder. Accordingly, backrinding may occur at such time, resulting in the formation of blemished parts, parts whose dimensions may fail to match precisely the dimensions of the cavities in which they are formed, and/or parts whose density may be less than that required by the specifications for the parts.

SUMMARY OF THE INVENTION

Accordingly, it is a principal object of the present invention to obviate the formation of waste or scrap within the injection cylinder of a molding apparatus by insulating the injection cylinder from the mold to prevent curing of an excess portion of elastomeric stock remaining within the injection cylinder while the latter remains in biasing relation with the mold.

It is a further object of the present invention to provide an insulation plate at the end of a "bottomless cylinder," the open end of the bottomless cylinder having a cross-sectional area which, in terms of the pressure developed therein, provides a mold closing force that is substantially greater than the corresponding mold opening force resulting from the projected area of, and pressure developed in, the combined mold cavities of the mold. This relationship prevents the mold cavity portions from separating from one another along their mutual parting lines and substantially obviates the seepage of flash forming elastomeric stock at the parting lines of the mold.

It is still a further object of the present invention to provide an insulation plate between an injection cylinder and a multi-cavity mold, whether the mold be of a flashless or non-flashless construction.

It is another object of the present invention to provide an insulation plate which is to be interpositioned between an injection cylinder and mold, irrespective of whether the injection cylinder and mold are movable horizontally or vertically relative to one another.

It is a further object of the present invention to provide an insulation plate which is mounted upon on injection cylinder and interposed between the latter and a mold, the insulation plate carrying a mold cavity cover which defines with the upper open portion of a mold cavity a constriction for generating a score line in the cured transferred portion of stock along which scrap cured in the cavity may be separated from the cured product. The cover may be either of fixed nature relative to the insulation plate or slightly axially movable relative thereto.

Briefly stated, the apparatus of the present invention generally comprises a heated mold having at least one mold cavity, an elastomeric stock injection cylinder having an open ended chamber in which elastomeric stock is disposable and from which elastomeric stock is transferable, and a heat-resistant, flexible, end insulation plate interposed between the mold and injection cylinder and having a plurality of apertures which are aligned with the mold cavity to permit transferring thereinto of elastomeric stock from the injection cylinder.

A mold cavity cover is carried by the insulation plate and confronts the mold cavity, the cover and upper open portion of the cavity when juxtaposed defining a constriction therebetween. An assembly is provided for moving the mold and injection cylinder relative to one another so that an exposed end face presented by the mold cavity is brought into flush pressing engagement with the insulation plate. The injection cylinder includes a piston for exerting pressure in the chamber against the elastomeric stock to expel and transfer at least a portion of the latter therefrom into the mold cavity through the intermediary of the corresponding insulation plate apertures and the aforementioned constriction. The insulation plate acts to prevent the heated mold from curing an excess portion of the elastomeric stock remaining in the injection cylinder during curing of that portion of the stock which was transferred into the mold cavities. The constriction between the cover and the upper portion of the cavity generates a score line in the cured transferred portion of stock along which scrap cured in the cavity may be separated from the cured product.

BRIEF DESCRIPTION OF THE DRAWINGS

The above and additional objects and advantages of this invention will be more clearly understood from the following detailed description thereof when read in conjunction with the accompanying drawings, in which:

FIG. 6 is a view similar to FIG. 2, but illustrating a second embodiment of the present invention;

DETAILED DESCRIPTION OF THE INVENTION

Figure 1:
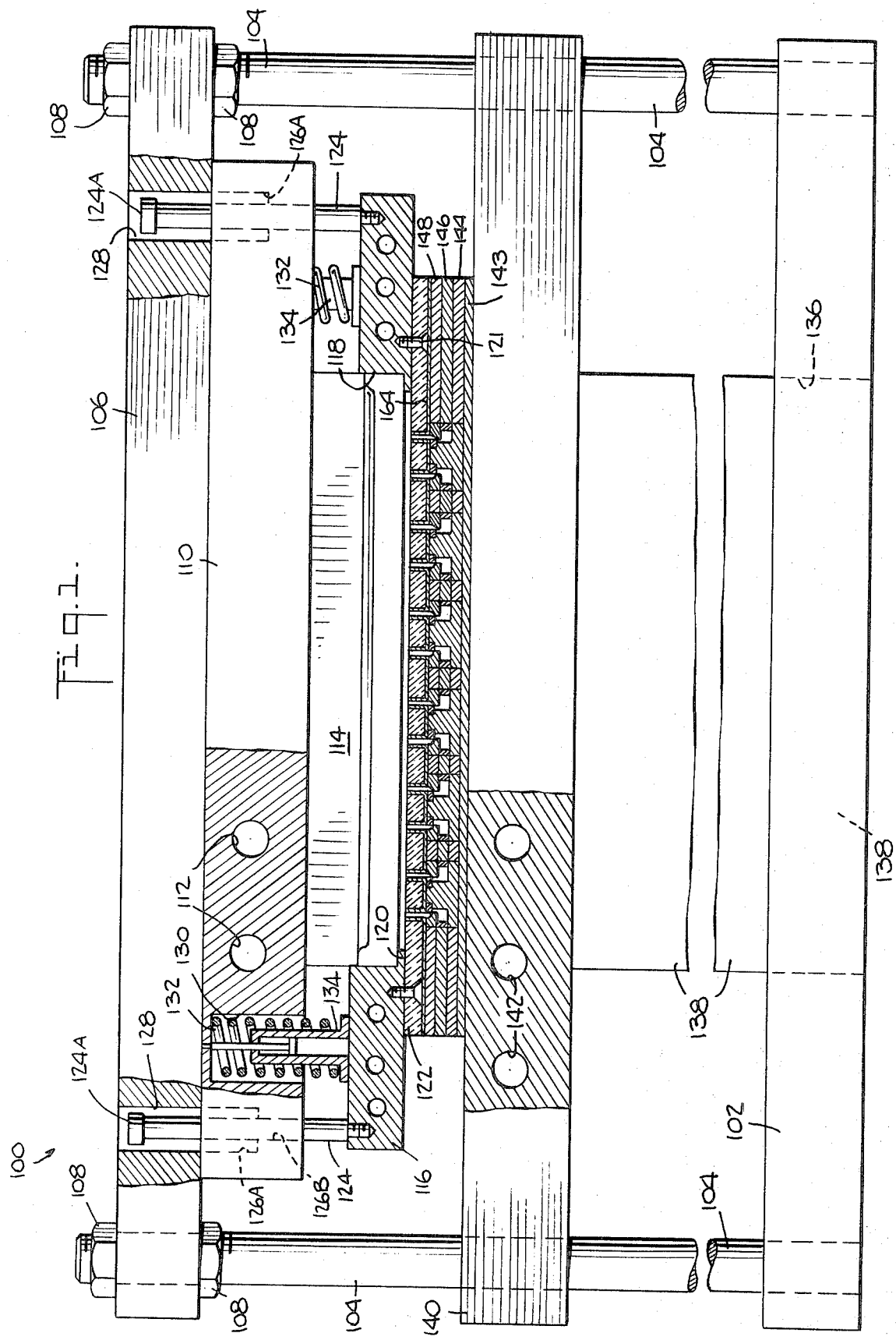
FIG. 1 is a fragmentary elevational view, partly in section, of a press illustrating the relationship of the insulation plate with a mold having inserts for defining the mold cavities, the inserts comprising insert elements which are of the flashless or locally deflectable variety.

Referring now to the drawings, and more particularly to FIG. 1, a press 100 is illustrated, which is of the type used for transfer or compression molding. The press 100 is provided with a base 102 and upright guide rods 104 which support a stationary cross-head 106 by means of fastening nuts 108. The stationary cross-head 106 supports therebeneath a stationary upper heating platen 110 provided with a plurality of heating channels 112 in which steam or some other conventional heating medium is confined. A downwardly facing stationary piston 114 is centrally secured to the underside of the upper heating platen 110 and cooperates with a bottomless cylinder plate 116 having an upper open end 118, and a lower open end 120. Suitably affixed to the bottom face of the cylinder plate 116, as by means of screws 121 or the like, is a multiapertured insulation plate 122 which overlies the lower open end 120 of the cylinder plate. The upper open end 118 of the latter, and thus the cylinder bore, is closely matched in size and configuration, to the piston 114.

The bottomless cylinder plate 116 is suspended upon, and is axially movable relative to, the stationary cross-head 106 by means of a plurality of elongate, bolt-like guide rods 124 threadedly affixed to the plate. The rods 124 extend slidably through respective bores or passageway 126 having an upper wider portion 126A to slidably receive a wide head 124A of each rod 124, and a lower narrower portion 126B to closely slidably receive the shank of the associated bolt and simultaneously to prevent the head 124A thereof from passing downwardly therethrough. Each lower narrow bore portion 126B thus defines the lowermost limit of downward movement of the cylinder plate 116. The rods 124 extend upwardly through bores 128 in the cross-head 106, these bores being wide enough to freely accommodate the bolt heads 124A.

A plurality of downwardly open recesses 130 (only one is shown) is provided in the stationary upper heating platen 110, each recess receiving and seating a respective compression spring 132 arranged in axially surrounding relation to a guide stud 134 projecting upwardly into the recess and affixed to the upper portion of the bottomless cylinder plate 116. The compression springs 132 act to urge the bottomless cylinder plate 116 toward its at-rest or lowermost suspended position.

Centrally arranged in the base 102 is a bore 136 in which is disposed a vertically movable ram 138 supporting at its upper end a lower movable heating platen 140 having heating channels 142 therein in which is provided a suitable heating medium such as steam or the like. Mounted upon the upper surface of the lower movable heating platen 140 is a heat insulatory plate 143 and a three-plate mold structure which comprises a base plate 144, a central plate 146 and an upper plate 148. The base plate 144 (FIG. 2) is provided with an array of recesses 150, the central plate 146 with an array of recesses 152 aligned with the underlying recesses 150, respectively, and the upper plate 148 with an array of recesses 154 aligned with the underlying recesses 152. Disposed in the various recesses are respective mold cavity-defining inserts, each group of such inserts comprising an imperforate core 156, an annular central cavity-defining insert 157, and an upper smaller diameter annular insert 158. Each group of inserts defines a respective mold cavity for curing elastomeric stock into annular products or articles.

Figure 2:
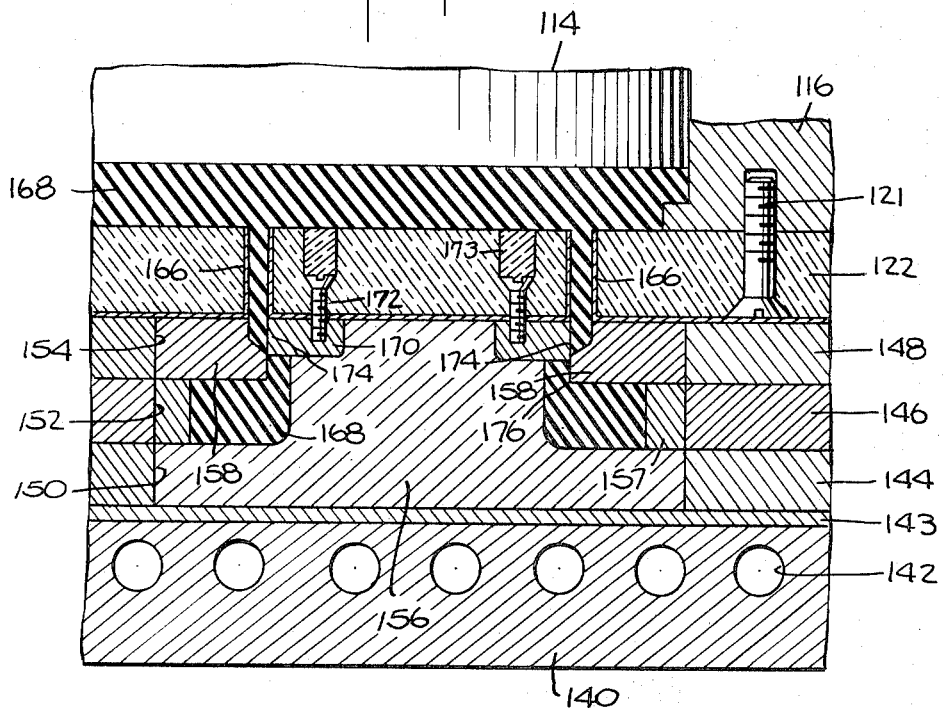
FIG. 2 is an enlarged, fragmentary, partially cross-sectional view of the lower right-side portion of the press of FIG. 1.
Figure 3:
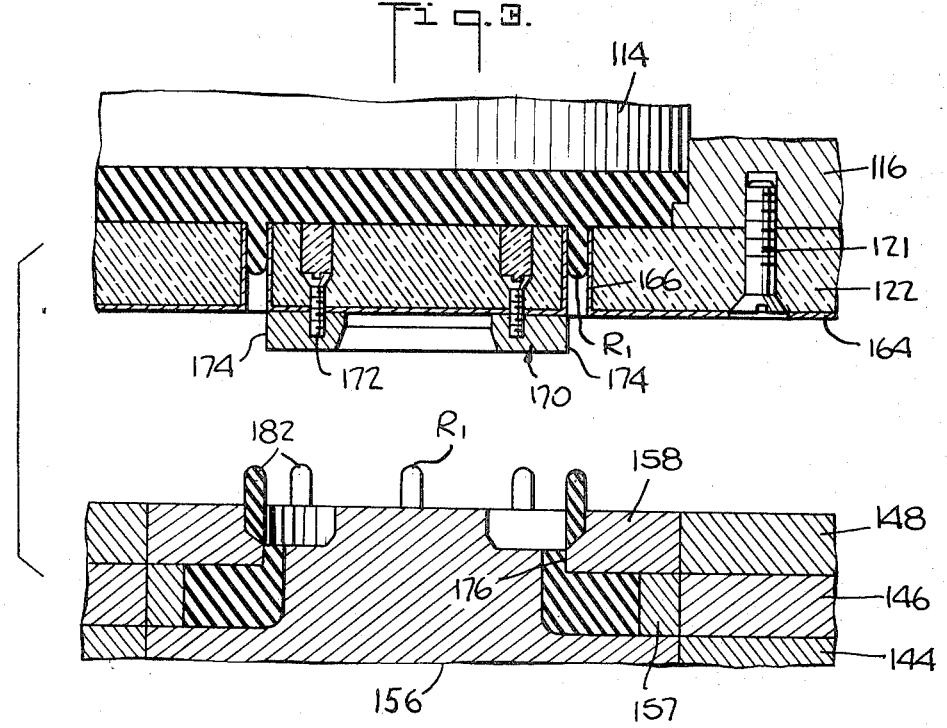
FIG. 3 is a fragmentary, cross-sectional view of the structure illustrated in FIG. 2, wherein the cylinder and mold are out of pressing relation with one another after the elastomeric stock has cured and is in a condition for removal from each mold cavity.

As best illustrated in FIGS. 2 and 3, the lower surface of the insulation plate 122 is provided with a multi-apertured coating or liner 164, the thickness of which is approximately one-tenth that of the insulation plate 122. The insulation plate 122 and liner 164 are each provided with correspondingly aligned apertures in which are fixedly disposed respective low-friction annular insets 166 constituted of a material similar to that available under the trademark "Teflon," e.g., polytrifluorochloroethylene, polytetrafluoroethylene, etc.

As best illustrated in FIG. 2, core 156 and its associated inserts 157 and 158 define a respective mold cavity in which elastomeric stock 168 may be cured into a final product. Associated with each mold cavity are respective mold cavity covers 170 (only one shown) which are affixed such as by means of screws 172 to the insulation plate 122. The screws 172 are countersunk within the insulation plate 122, thereby leaving respective bores in the insulation plage 122 which are filled with appropriate insulatory material 173 corresponding to the material of the insulation plate 122.

Each core 156 is provided with an upper free end portion of preferably circular cross-section for receiving and being surrounded by a respective one of the covers 170. In this respect, each of the covers 170 is preferably of annular extent and provided with an inner circular edge which complements the cross-sectional configuration of the upper free end portion of the core 156 associated therewith. The outer edge 174 of each of the covers 170 is substantially tangentially associated with, and bridges, a respective circular array of apertures (for example 8 apertures) which communicate with a respective one of the mold cavities.

Figure 5:
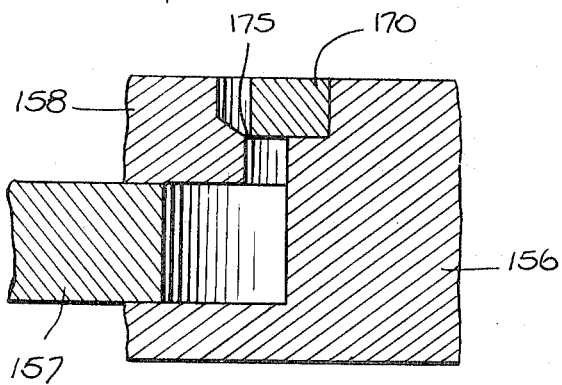
FIG. 5 is a further enlarged view illustrating the constriction between the mold cavity cover and the upper mold insert.

The outer edge 174 defines cooperatively with an inner mating circular edge 176 of an associated upper insert 158 an annular gap ("gate") or constriction which intercommunicates a respective array of apertures in the insulation plate 122 with the mold cavity therebeneath. The constriction is denoted by reference character 175 (FIG. 5) and is effective to generate a score line in the elastomeric stock, cured in the mold cavity, between an upper portion of cured scrap (above the constriction) and a lower cured product (beneath the constriction).

Pursuant to the principal concept of the present invention, the insulation plate 122 should be of rather thin flexible nature to minimize the axial extent of the passageway that the elastomeric stock must traverse as it is transferred from the bottomless cylinder plate 116 into the respective mold cavities. However, the insulation plate 122 should be of sufficient thickness to prevent an excess portion of the elastomeric stock remaining in the bottomless cylinder plate 116 from being cured during the curing of that portion transferred into the mold cavities.

In this respect, the particular nature or composition of the elastomeric stock that is to be transferred, in conjunction with the particular temperatures that are developed, such as in the range of 100°–200° C., will determine the necessary thickness of the insulation plate 122. Moreover, it has been determined that the insulation plate 122 should be preferably constituted of a mixture of asbestos fibers and a thermosetting resin, such as phenol resin or the like, and appropriately cured such that it is imparted with the necessary flexibility and heat-resistant qualities. It is preferable that the thermal conductivity of the insulation plate 122 be less than about 0.5 kcal/m/hr/°K, but it may exceed about 0.05 kcal/m/hr/°K. The compression resistance of the insulation plate 122 at temperatures of approximately 180°–200° C. should not be less than from about 200–2,000 kg/cm$^2$. The compression resistance rates the capacity of the plate 122 to withstand a compression load without undergoing permanent deformation. The modulus of elasticity of the insulation plate 122 should be at least, and preferably greater than, about $1.5 \times 10^5$ Kg./mm.$^2$. The liner 164 provided along the lower face of the insulation plate 122 should likewise be constituted of the same or similar material.

In operation, elastomeric stock 168, in biscuit form, is initially disposed in the space between the lower surface of the piston 114 and the upper surface of the insulation plate 122. The ram 138 is then elevated, causing the lower, movable heating platen 140 to ascend until each of the upper inserts 158 engages the liner 164 of the insulation plate 122, and each of the covers 170 fully projects into the upper insert 158 associated therewith and surrounds the upper portion of the core 156 associated therewith. The heating medium in the heating channels 112 acts at this stage to aid in the conversion of the elastomeric stock 168 from the form of a generally solid biscuit to a more fluid mass, but the heat is insufficient for curing the elastomeric stock 168. This permits a portion of the elastomeric stock 168 to be subsequently forced through the passageways in the low-friction annular insets 166 of the insulation plate 122.

The lower heating platen 140 then continues to rise, thereby causing the bottomless cylinder plate 116 to likewise ascend relative to the piston 114 until the latter enters into the chamber 118 of the bottomless cylinder plate 116. This causes the elastomeric stock 168 to disperse uniformly over the entire upper surface of the insulation plate 122 so that it is expelled in part through the low-friction annular insets 166, through constrictions between cores 156 and associated upper inserts 158, and into the mold cavities.

The initial quantity of the elastomeric stock 168 is in excess of that required for filling the mold cavities defined by the cooperating core, central and upper mold inserts 156, 157 and 158, respectively. Thus, there is a substantial amount of elastomeric stock 168 which remains within the confines of the chamber defined in the bottomless cylinder plate 116 at the end of the injection stage. This ensures that the fluid injection pressure required for expelling and transferring a portion of the elastomeric stock 168 into the various mold cavities can also be maintained after and even though the cavities are all filled with molding compound.

The heat provided by the heating medium within the heating channels 142 of the lower movable platen 140 is sufficient for curing the portion of the elastomeric stock 168 transferred into the mold cavities, the curing taking place while the bottomless cylinder plate 116 and platen 140 are in contact with one another through the intermediary of the insulation plate 122. The insulation plate 122, however, serves to prevent curing of the elastomeric stock remaining within the confines of the bottomless cylinder plate 116. At the same time, the flexible nature of insulation plate 122 ensures that the fluid pressure in the cylinder can be utilized for locally deflecting the mold inserts 156, 157 and 158, which are of the flashless or locally deflectable variety, relative to one another, so that each may deflect where necessary to seal any gaps between their respective parting lines and obviate the formation of flash which may otherwise form at the parting lines.

As the transferred portion of the elastomeric stock 168 cures within the confines of the respective mold cavities, each of the constrictions 175 between associated ones of the cores 156 and the upper inserts 158 generates a score line in the transferred portion of elastomeric stock 168 along which scrap cured within the upper annular clearance above each constriction 175, and between the insulation plate 122 and each of the upper inserts 158, may be subsequently separated from cured elastomeric product formed within each mold cavity below the constrictions 175.

At the end, or at least during the final stages of the curing cycle of the elastomeric stock 168 transferred into the mold cavities, the lower heating platen 140 may be retracted and caused to descend relative to the upper stationary platen 110, thereby permitting the springs 132 to move the bottomless cylinder plate 116 into its lowermost, at-rest, suspended position. When the lower heating platen 140 is sufficiently lowered, or is retracted sufficiently remote from the lowermost suspended position of the bottomless cylinder plate 116, as illustrated in FIG. 3, that inaccessible minute portion of the elastomeric stock 168 confined in each of the low-friction annular inserts 166, respectively, tears medially along respective lines $R_1$ into two portions, one of which remains in adherence with that portion of the elastomeric stock 168 remaining in the chamber of the bottomless cylinder 116, and the other of which remains in adherence with the portion of elastomeric stock 168 transferred into the mold cavities.

Figure 4:
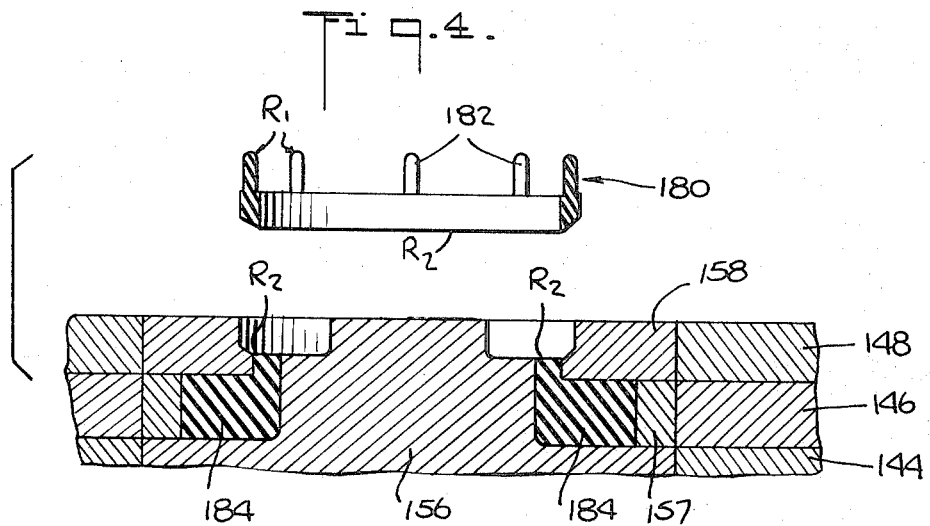
FIG. 4 is a fragmentary, cross-sectional view of the relationship of a typical mold cavity.

Accordingly, as best illustrated in FIG. 4, there is formed between the upper portion of each of the cores 156 and the inner edge 176 of each of the upper inserts 158, an annular mass of scrap 180 having a circumferential array of axially extending spaced lugs 182 corresponding in number to that of the number of apertures or insets 166 in each array communicating with respective ones of the mold cavities. The score line, denoted by reference character $R_2$, represents means along with the scrap masses 180 may be separated from the desired cured product 184 formed in each of the mold cavities. The mold product 184 may be removed from each of the mold cavities upon removal of the overlying upper inserts 158.

Figure 7:
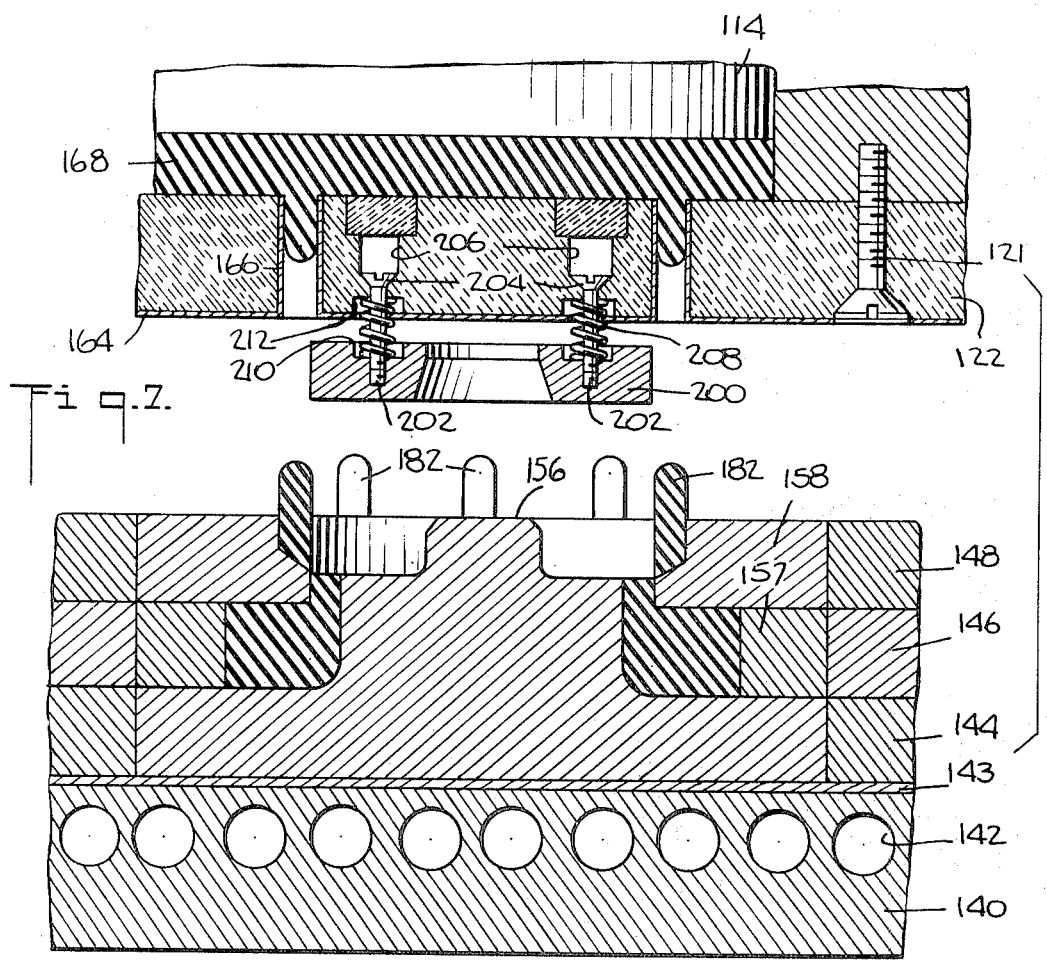
FIG. 7 is a view similar to FIG. 3, but illustrating a third embodiment of the present invention.
Figure 8:
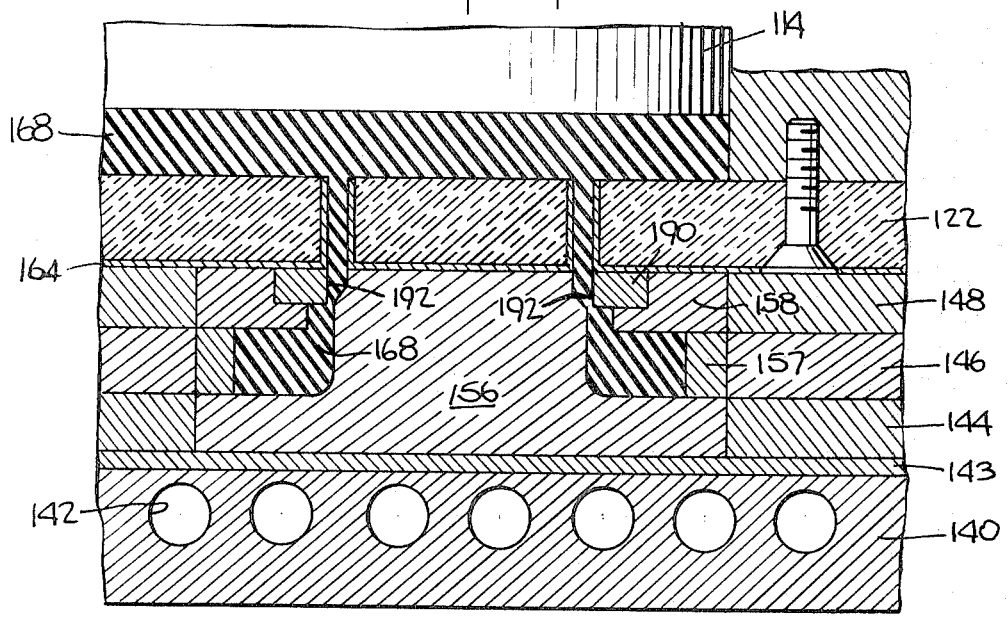

Two further embodiments of the present invention are illustrated in FIGS. 6 and 7 respectively. It will be understood that those elements of the embodiments illustrated in FIGS. 6 and 7 which correspond to similar elements in FIGS. 1-5, have like reference characters.

In the embodiment pursuant to FIG. 6, it is contemplated that each mold cavity cover (denoted by character 190) be likewise fixedly secured to the liner 164 and insulation plate 122, but in this instance be provided with an inner circular edge 192 which tangentially bridges an associated array of apertures or insets 166 in the insulation plage 122. Thus, the basic distinction between the embodiment of FIG. 6 and that of the embodiment of FIGS. 1-5, is that in the embodiment of FIG. 6 the inner circular edge 192 of each mold cavity cover 190 is tangentially associated with and bridges an associated array of apertures in the insulation plate 122, whereas in the embodiment of FIGS. 1-5, the mold cavity cover 170 is provided with an outer circular edge 174 which is tangentially associated with and bridges an associated array of apertures in the insulation plate 122.

With regard to the embodiment of FIG. 7, the insulation plate 122 carries mold cavity covers 200 which are movable slightly axially relative thereto. In this respect, each cover 200 has affixed thereto a plurality of axially extending screws 202, the screws having head portions 204, respectively, which are endwise movable freely within the confines of appropriate bores 206 formed axially of and in the insulation plate 122. The upper portion of the bores 206 are closed such as by means of a filler insulatory material corresponding to that of the material of which the insulation plate 122 is constituted.

Concentrically arranged upon each of the screws 202, and interposed between the insulation plate 122 and each mold cavity cover 200 are compression springs 208. The opposite ends of each of the compression springs 208 are received by and seated in respective confronting recesses 210 and 212 formed in each cover 200 and the insulation plate 122, respectively.

The distinction between the embodiments of FIGS. 1 and 7, or FIGS. 6 and 7 is that in the embodiments of FIGS. 1 and 6 each mold cavity cover 170, 190 is fixed to and restrained against axial movement relative to the insulation plate 122. On the other hand, in the embodiment of FIG. 7, each mold cavity cover 200 is movable slightly axially relative to the insulation plate 122. This permits slight axial retraction of the mold or platen 140 away from the insulation plate 122 during the curing cycle of the elastomeric stock within each of the mold cavities, while there is retained a mold cavity closure force generated by each of the covers 200, via the compression spings 208, against the upper inserts 158. This enhances the thermal insulatory capacity of the press, since the insulation plate 122 is separated by an air gap from the upper inserts 158 by a distance corresponding to the spacing between each of the mold cavity covers 200 and the liner 164 of the insulation plate 122.

Having thus set forth the nature of the invention, it will be understood that the foregoing description of preferred embodiments of the present invention is for purposes of illustration only, and that the various structural and operational features and relationships herein disclosed are susceptible to a number of modifications and changes none of which entails any departure from the spirit and scope of the present invention as defined in the hereto appended claims.

What is claimed is:

1. Apparatus for molding elastomeric stock, said apparatus comprising: a mold provided with at least one mold cavity for shaping and curing elastomeric stock in the form of said cavity; an elastomeric stock injection unit having a chamber in which elastomeric stock is disposable and can be subjected to pressure for transfer from said chamber; a heat-resistant, flexible insulation plate positioned intermediate said mold and said injection unit, said insulation plate including flat, opposed, side faces and a fixed array of apertures therethrough for intercommunicating said injection unit with said mold cavity; a mold cavity cover carried by said insulation plate and confronting said mold cavity, said cover having an edge which bridges said array of apertures with one another, said mold cavity having an upper open portion for receiving said cover, said upper open portion and said edge when juxtaposed defining a constriction intercommunicating said cavity with said apertures; means for heating said mold; and means for moving said mold and said injection unit relative to one another in such a manner that said mold and said injection unit are pressed against the opposite side faces of said insulation plate, and said cover projects into said upper open portion of said cavity to define said constriction; whereby upon exertion of pressure in said chamber against said elastomeric stock a portion of said stock will be expelled from said chamber and concurrently transferred through each of said apertures, through said constriction and into said cavity, said insulation plate serving to thermally insulate a remaining portion of excess elastomeric stock in said chamber from said heated mold, without separation of said mold or said injection unit from said insulation plate or relaxation of said fluid pressure, in order to prevent the curing of said remaining portion of stock with the curing of said transferred portion of stock, said constriction generating a score line in said cured transferred portion of stock along which cured elastomeric scrap formed in said upper open portion may be separated from cured elastomeric product formed in the remainder of said cavity.

2. Apparatus as claimed in claim 1, wherein said mold includes a core, and a plurality of annular plates superposed upon one another and defining cooperatively with said core an annular clearance which constitutes said mold cavity, said core including a free end portion, said cover having an extent adapted to overlie said annular clearance and an enlarged opening complementing the cross-section of, and adapted to closely surround, said free end portion of said core.

3. Apparatus as claimed in claim 2, wherein said cover is fixedly secured to said insulation plate.

4. Apparatus as claimed in claim 2, wherein said cover is movable axially relative to said insulation plate.

5. Apparatus as claimed in claim 4, including resilient means interposed between said cover and said insulation plate for separating said cover and insulation plate from one another.

6. Apparatus as claimed in claim 5, wherein said resilient means includes at least one compression spring.

7. Apparatus as claimed in claim 2, wherein said mold includes a plurality of apertured retainer plates superposed upon one another for confining corresponding ones of said annular plates, said annular plates being insertable into said retainer plates and movable locally relative to one another and relative to said core.

8. Apparatus as claimed in claim 7, wherein said annular plates and said core are associated with one another as an insert group for defining said mold cavity, and including further cores and annular plates associated with one another as further insert groups for defining further mold cavities, said retainer plates each including a plurality of apertures coaxially alinged with corresponding apertures in the others of said retainer plates for confining corresponding ones of said further insert groups, said insulation plate including further mold cavity covers aligned coaxially with corresponding ones of said further insert groups and operatively associated with the latter in a manner similar to that of the first said cover with the first said insert group.

9. Apparatus as claimed in claim 2, wherein said edge of said cover is substantially tangentially associated with said apertures in said insulation plate.

10. Apparatus as claimed in claim 9, wherein said cover has a substantially annular extent defined by an inner edge and an outer edge, said outer edge constituting said edge which is substantially tangentially associated with said apertures in said insulation plate.

11. Apparatus as claimed in claim 9, wherein said cover has a substantially annular extent defined by an inner edge and an outer edge, said inner edge constituting said edge which is substantially tangentially associated with said apertures in said insulation plate.

12. Apparatus as claimed in claim 2, wherein said injection unit includes a stationary piston and a cylinder axially movable relative thereto, said mold being supported for axial movement relative to said piston, such that said mold is movable into engagement with said cylinder and is then effective to move the latter relative to said piston to reduce the axial extent of said chamber, thereby to cause a portion of said elastomeric stock to be injected from said chamber into said mold cavity.

13. Apparatus as claimed in claim 2, wherein said insulation plate has a thermal-conductive capacity which is substantially less than the thermal-conductive capacity of iron.

14. Apparatus as claimed in claim 13, wherein the thermal conductivity of said insulation plate is in the range of 0.05–0.5 kcal/m/hr./°K.

15. Apparatus as claimed in claim 2, wherein said insulation plate has a compression resistance in the range of 200–2,000 kg./cm.$^2$ at temperatures between 180°–200° C.

16. Apparatus as claimed in claim 2, wherein said insulation plate is constituted of an asbestos fiber and thermoset resin mixture.

17. Apparatus as claimed in claim 16, wherein said thermoset resin comprises phenol resin.

18. Apparatus as claimed in claim 2, wherein said insulation plate includes, on the side face thereof which confronts and contacts said mold, a thin layer of hardenable, flexible material which undergoes increasing hardening when subjected to the heat and pressure of said heated mold, said layer having on the surface thereof facing said mold a profile complementary to the profile of the surface of said mold in contact therewith.

19. Apparatus as claimed in claim 18, wherein said thin layer is constituted of an asbestos fiber and thermoset resin mixture.

20. Apparatus as claimed in claim 19, wherein said thermoset resin of said thin layer comprises phenol resin.

21. Apparatus as claimed in claim 2, wherein said insulation plate has a thickness sufficient to maintain a temperature gradient thereacross such that, when the side face thereof which confronts said mold is at the curing temperature for said elastomeric stock in said mold cavity, the temperature on the opposite side face of said insulation plate which confronts said chamber remains at a temperature insufficient to cause the excess elastomeric stock remaining in said chamber to become cured.

22. Apparatus as claimed in claim 2, including respective annular insets disposed in said apertures of said insulation plate, said annular insets being constituted of a material having an adhesion resistance to said elastomeric stock greater than that of said insulation plate.

23. Apparatus as claimed in claim 22, wherein said annular insets are constituted at least in part of polytetrafluoroethylene or like material.

* * * * *